(12) United States Patent
Kumar et al.

(10) Patent No.: US 9,037,590 B2
(45) Date of Patent: May 19, 2015

(54) ADVANCED SUMMARIZATION BASED ON INTENTS

(71) Applicant: Formcept Technologies and Solutions Pvt Ltd, Bangalore (IN)

(72) Inventors: Anuj Kumar, Bangalore (IN); Suresh Srinivasan, Bangalore (IN)

(*) Notice: Subject to any disclaimer, the term of this patent is extended or adjusted under 35 U.S.C. 154(b) by 24 days.

(21) Appl. No.: 13/746,316

(22) Filed: Jan. 22, 2013

(65) Prior Publication Data
US 2013/0191392 A1 Jul. 25, 2013

(30) Foreign Application Priority Data
Jan. 23, 2012 (IN) .............................. 263/CHE/2012

(51) Int. Cl.
*G06F 17/30* (2006.01)
*G06F 17/24* (2006.01)

(52) U.S. Cl.
CPC .......... *G06F 17/30713* (2013.01); *G06F 17/24* (2013.01); *G06F 17/30719* (2013.01)

(58) Field of Classification Search
CPC .................... G06F 17/30705; G06F 17/30713; G06F 17/30719; G06F 17/24
USPC ................................................ 707/737, 748
See application file for complete search history.

(56) References Cited

U.S. PATENT DOCUMENTS

| | | | |
|---|---|---|---|
| 6,823,331 B1 * | 11/2004 | Abu-Hakima ................. | 707/758 |
| 7,580,918 B2 * | 8/2009 | Chang et al. .......................... | 1/1 |
| 7,761,298 B1 * | 7/2010 | Pereira et al. .................. | 704/257 |
| 7,860,817 B2 * | 12/2010 | Sweeney et al. ................ | 706/48 |
| 8,209,665 B2 * | 6/2012 | Rama et al. .................... | 717/122 |
| 8,676,732 B2 * | 3/2014 | Sweeney et al. ................ | 706/12 |
| 8,751,218 B2 * | 6/2014 | Dang et al. ........................ | 704/9 |
| 2008/0104032 A1 * | 5/2008 | Sarkar ............................... | 707/3 |
| 2009/0287685 A1 * | 11/2009 | Charnock et al. ................ | 707/5 |
| 2012/0166372 A1 * | 6/2012 | Ilyas et al. ....................... | 706/14 |
| 2012/0166373 A1 * | 6/2012 | Sweeney et al. ................ | 706/14 |
| 2013/0275359 A1 * | 10/2013 | Sweeney et al. ................ | 706/55 |
| 2013/0282647 A1 * | 10/2013 | Sweeney et al. ................ | 706/55 |

OTHER PUBLICATIONS

Formica, Anna, "Concept Similarity in Formal Concept Analysis: An Information Content Approach", Knowledge-Based Systems, vol. 21, © 2007, pp. 80-87.*

Kim, Mihye, "Document Management and Retrieval for Specialised Domains: An Evolutionary User-Based Approach", Thesis—Doctor of Philosophy in Computer Science, The University of New South Wales, Sydney, Australia, Canada, Mar. 2003, 213 pages.*

Stumme, Gerd, "Formal Concept Analysis", Handbook on Ontologies, International Handbooks on Information Systems, Springer-Verlag, Berlin, Germany, © 2009, pp. 177-199.*

(Continued)

*Primary Examiner* — Robert Stevens
(74) *Attorney, Agent, or Firm* — The Law Office of Austin Bonderer, PC

(57) ABSTRACT

A method for summarizing content using weighted Formal Concept Analysis (wFCA) is provided. The method includes (i) identifying, by a processor, one or more keywords in the content based on parts of speech, (ii) disambiguating, by the processor, at least one ambiguous keyword from the one or more keywords using the wFCA, (iii) identifying, by the processor, an association between the one or more keywords and at least one sentence in the content, and (iv) generating, by the processor, a summary of the content based on the association.

13 Claims, 14 Drawing Sheets

(56) References Cited

OTHER PUBLICATIONS

Cimiano, Philipp, et al., "Learning Concept Hierarchies from Text Corpora using Formal Concept Analysis", Journal of Artificial Intelligence Research, vol. 24, © 2005, pp. 305-339.*

Chen, Rung-Ching, et al., "Merging Domain Ontologies Based on the WordNet System and Fuzzy Formal Concept Analysis Techniques", Applied Soft Computing, vol. 11, issue 2, Mar. 2011, pp. 1908-1923.*

* cited by examiner

INTRODUCTION
REUTERS: the chairman of kingfisher Airlines, Vijay Mallaya, said in an interview with the financial times that he was close to sealing a $370 million deal with an Indian private investor and a consortium of banks that would save the airlines.
The Bangalore-based entrepreneur told the FT he was nearing a deal with 14 banks led by State Bank Of India that would provide the loss-making carrier with working capital of 6 billion rupees. He did not name the banks.
Earlier this week, kingfisher said its net loss for the September quarter doubled but Mallaya offered little to 502 revive its finances. It had also said it has been approached by strategic investors.
Mallaya, a flamboyant liquor baron who owns a Formula One Motor-racing team, told the paper he was finalizing a separate $250 million equity injection from an unnamed wealthy Indian individual to recapitalize the cash-strapped carrier. He added that he was about to conclude a deal with the banks to reduce the interest rate which the airlines is currently paying on its $1.4 billion debt pile. Mallaya said on the social networking site Twitter that the report was "factually wrong" but he did not elaborate Reuters could not immediately reach company officials for a comment.
SHARES
Shares kingfisher which is named after its best selling beer , were down more than 5 percentage in early trade on Friday in Mumbai. Kingfisher ,which listed when it bought out budget airline, Air Deccan in 2008, has never made a profit and its market value has plunged 64percentage this year. The airlines become No.2 private carrier since it began its operations in 2005 as the economy boomed but has become one of the main causalities of high fuel costs and a fierce price war between a handful of airlines which, between them, have ordered hundreds of aircraft on delivery over the next decade in an ambitious bet on the future.

| KEY WORDS | NUMBER OF ASSOCIATIONS 1104 | WEIGHT 1102 |
|---|---|---|
| K1 | 7 | 0.04762/7 |
| K2 | 1 | 0.04762 |
| K3 | 1 | 0.04762 |
| K4 | 1 | 0.04762 |
| K5 | 2 | 0.04762/2 |
| K6 | 2 | 0.04762/2 |
| K7 | 3 | 0.04762/3 |
| K8 | 4 | 0.04762/4 |
| K9 | 3 | 0.04762/3 |
| K10 | 1 | 0.04762 |
| K11 | 1 | 0.04762 |
| K12 | 1 | 0.04762 |
| K13 | 6 | 0.04762/6 |
| K14 | 1 | 0.04762 |
| K15 | 1 | 0.04762 |
| K16 | 1 | 0.04762 |
| K17 | 1 | 0.04762 |
| K18 | 1 | 0.04762 |
| K19 | 1 | 0.04762 |
| K20 | 1 | 0.04762 |
| K21 | 1 | 0.04762 |

| SENTENCES | ASSOCIATED KEYWORDS 1204 | WEIGHT 1202 | |
|---|---|---|---|
| S1 | K1,K3,K5,K6,K7,K8,K9, K10, K13 | K1+K3+K5+K6+K7+ K8+K9+K10+K13 | 0.04762/7+0.04762+0.04762/ 2+0.04762/2 +0.04762/3+0.04762/4+ 0.04762/3+0.04762+0.04762/6 | 0.2013 |
| S2 | K4, K7, K8, K9, K11, K12 | K4+K7+K8+K9+K11 +K12 | 0.04762+0.04762/3+0.04762/ 4+0.04762/3+0.04762+0.04762 | 0.1865 |
| S3 | K8, K13 | K8+K13 | 0.04762/4+0.04762/6 | 0.01984 |
| S4 | K1, K13 | K1+K13 | 0.04762/7+0.04762/6 | 0.01474 |
| S5 | K1, K6 | K1+K6 | 0.04762/7+0.04762/2 | 0.03061 |
| S6 | K7, K13, K14 | K7+K13+K14 | 0.04762/3+0.04762/6+0.04762 | 0.07143 |
| S7 | K1, K8, K9, K13, K16 | K1+K8+K9+K13+ K16 | 0.04762/7+0.04762/4+0.04762/ 3+0.04762/6+0.04762 | 0.0901 |
| S8 | K5, K13 | K5+K13 | 0.04762/2+0.04762/6 | 0.03175 |
| S9 | K1, K2 | K1+K2 | 0.04762/7+0.04762 | 0.05442 |
| S10 | K1, K15, K17 | K1+K15+K17 | 0.04762/7+0.04762+0.04762 | 0.10204 |
| S11 | K1, K18, K19, K20, K21 | K1+K18+K19+K20 +K21 | 0.04762/ 7+0.04762+0.04762+0.04762+0.0 4762 | 0.1973 |

ADVANCED SUMMARIZATION BASED ON INTENTS

CROSS-REFERENCE TO RELATED APPLICATIONS

This application claims priority to Indian patent application no. 263/CHE/2012 filed on Jan. 23, 2012, the complete disclosure of which, in its entirety, is herein incorporated by reference.

BACKGROUND

1. Technical Field

The embodiments herein generally relate to content summarization, and more particularly to a system and method for summarizing content using weighted formal concept analysis (wFCA) based on user intent.

2. Description of the Related Art

Documents obtained via an electronic medium (i.e., Internet or on-line services, or any other services) are often provided in such volume that it is important to summarize them. It is desired to be able to quickly obtain a brief summary of a document rather than reading in its entirety. Typically, such document may span multiple paragraphs to several pages in length.

Summarization or abstraction is even more essential in the framework of emerging "push" technologies, where a user has hardly any control over what documents arrive at the desktop for his/her attention. Summarization is always a key feature in content extraction and there is currently no solution available that provides a summary that is comparable to that of a human. Conventionally, summarization of content is manually performed by users, which is time consuming and also expensive. Further, it is slow and also not scalable for a large number of documents.

Summarization involves representing whole content into a limited set of words without losing main crux of the content. Traditional summarization of content (in general a document) is based on lexical chaining, in which the longest chain is assumed to best represent the content, and first sentence of a summary is taken from first sentence of the longest chain. The second-longest chain is assumed to be the next best, and second sentence of the summary is then taken from first sentence of the second longest chain. However, this lexical chaining approach tends to not only miss out on important content related to intent of the user but also fails to elaborate it in a manner in which it can be easily understood. Accordingly, there remains need for a system to automatically analyze one or more documents and generate an accurate summary based on user intent.

SUMMARY

In view of the foregoing, an embodiment herein provides a method for summarizing content using weighted Formal Concept Analysis (wFCA). The method includes (i) identifying, by a processor, one or more keywords in the content based on parts of speech, (ii) disambiguating, by the processor, at least one ambiguous keyword from the one or more keywords using the wFCA, (iii) identifying, by the processor, an association between the one or more keywords and at least one sentence in the content, and (iv) generating, by the processor, a summary of the content based on the association. The method may further include generating a lattice that includes one or more concepts which are generated with (i) the one or more keywords as objects, and (ii) categories associated with the one or more keywords as attributes. The categories that associated with the one or more keywords may be obtained from a knowledge base, and may not be arranged on a hierarchy.

A score may be computed for a concept of the one or more concepts based on (i) a number of associations of the concept with other concepts in the lattice, and (ii) the one or more keywords. The method may further include drilling-down a subset of categories associated with the one or more keywords to obtain a contextual information. The subset of categories may be arranged hierarchically. The contextual information may indicate an affinity among the one or more keywords, and may be obtained to disambiguate the at least one ambiguous keyword. A graph may be generated to identify the association, and the graph may include one or more nodes. Each node of the one or more nodes may indicate a sentence in the content. A weight may be assigned for a sentence of the content based on a count that corresponds to the one or more keywords associate with a node that corresponds to the sentence. The weight may indicate the association between the sentence and the one or more keywords. The summary may be expanded based on the weight assigned for the each sentence in the content.

In another embodiment, a non-transitory program storage device readable by computer, and including a program of instructions executable by the computer to perform a method for summarizing content using weighted Formal Concept Analysis (wFCA) is provided. The method includes (i) identifying, by a processor, one or more keywords in the content based on parts of speech. (ii) disambiguating, by the processor, at least one ambiguous keyword from the one or more keywords using the wFCA. The wFCA includes generation of a lattice that includes one or more concepts which are generated with (a) the one or more keywords as objects, and (b) categories associated with the one or more keywords as attributes. The categories that associate with the one or more keywords are obtained from a knowledge base. The method further includes: (iii) generating, by the processor, a graph to identify an association between the one or more keywords and at least one sentence in the content. The graph includes one or more nodes, and each node indicates a sentence in the content, and (iv) generating, by the processor, a summary of the content based on the association. The categories that associate with the one or more keywords may not be arranged based on a hierarchy.

The method may further include drilling-down a subset of categories associated with the one or more keywords to obtain a contextual information. The subset of categories may be arranged hierarchically. The contextual information may indicate an affinity among the one or more keywords. A weight may be assigned for a sentence of the content based on a count that corresponds to the one or more keywords associate with a node that corresponds to the sentence. The weight may indicate the association between the sentence and the one or more keywords.

In yet another embodiment, a system for summarizing content around a keyword based on weighted Formal Concept Analysis (wFCA) using a content summarization engine is provided. The system includes (a) memory unit that stores (i) a set of modules, and (ii) a database, (b) a display unit, (c) a processor that executes the set of modules. The set of modules include: (i) a keyword identifying module executed by the processor that processes a first input includes a selection of the keyword around which summarization of the content occurs. (ii) a disambiguating module executed by the processor that disambiguates the keyword using the wFCA. The wFCA includes generation of a lattice with one or more keywords as objects, and categories associated with the one or more keywords as attributes. The categories that associate with the one or more keywords are obtained from a knowledge base. The one or more keywords are obtained based on parts of speech. (iii) a graph generating module executed by the processor that generates a graph to identify an association between the keyword and at least one sentence in the content. The graph includes one or nodes, and each node indicates a sentence in the content, and (iv) an intent building module executed by the processor that generates a summary on the content around the keyword based on the association.

The graph generating module may further include a weight assigning module executed by the processor that may assign a weight for a sentence of the content based on a count that corresponds to the one or more keywords associate with a node that corresponds to the sentence. The weight may indicate the association between the sentence and the one or more keywords. A sentence identifying module of the set of modules executed by the processor that may identify one or more sentences that are associated with the keyword. An intent expanding module of the set of modules executed by the processor that may expand the summary based on a weight assigned for each sentence of the one or more sentences.

BRIEF DESCRIPTION OF THE DRAWINGS

The embodiments herein will be better understood from the following detailed description with reference to the drawings, in which:

FIG. 5 illustrates a user interface view of an input content to be summarized using the content summarization engine of FIG. 1 according to an embodiment herein;

DETAILED DESCRIPTION OF PREFERRED EMBODIMENTS

Figure 1:
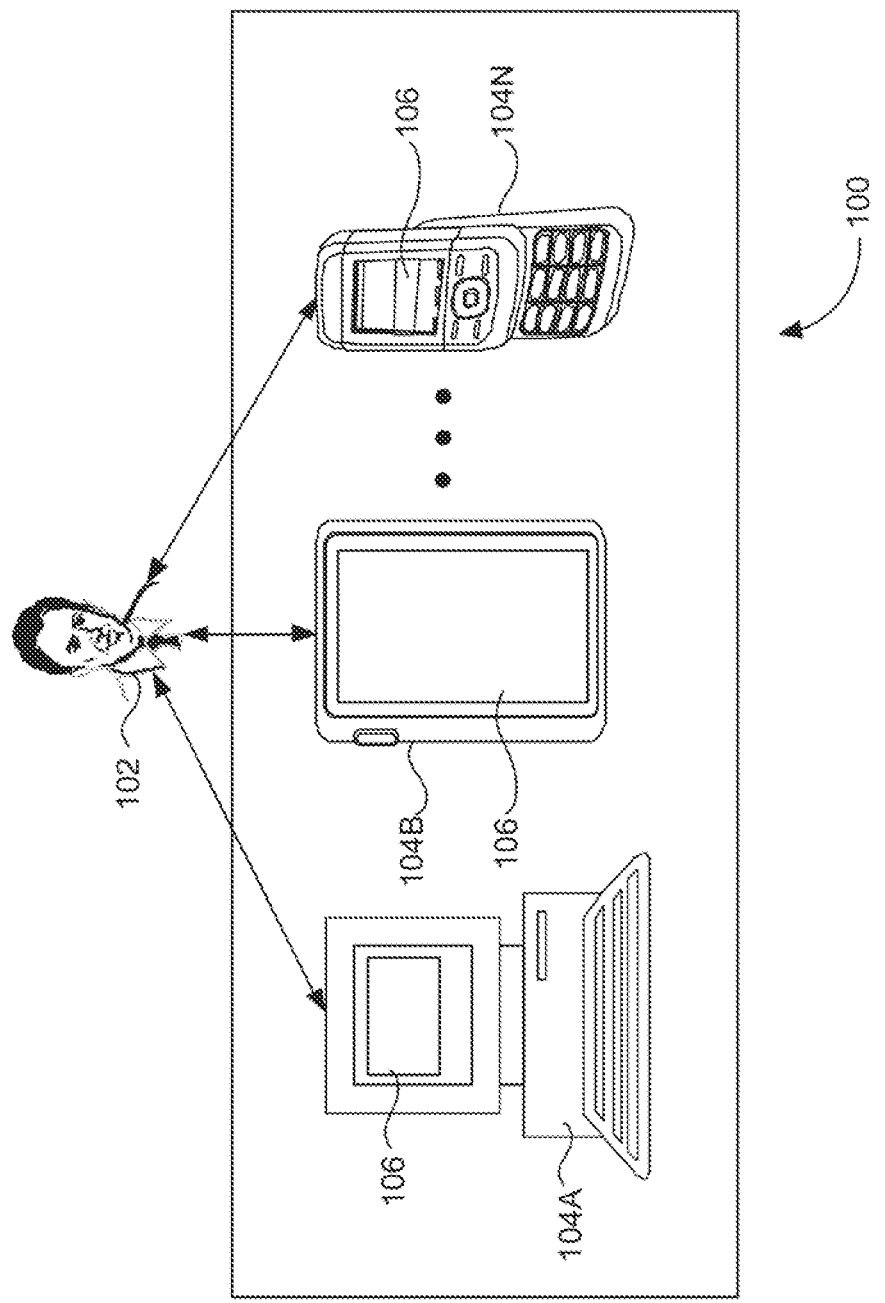
FIG. 1 illustrates a system view of a user communicating with a user system to generate a summary using a content summarization engine according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system to automatically analyze one or more documents and generate an accurate summary based on user intent. The user intent may be an overall summarization, a keyword based summarization, a page wise summarization, and/or a section wise summarization. The content summarization engine computes crux of content of a document, and generates a main story surrounding the content. The content summarization engine also provides an option for an end user to expand a summary for better understanding. The content summarization engine takes the end user directly to a main concept from where he/she can expand, and read the content in a flow that can give a better understanding without expending time in reading entire content. Referring now to the drawings, and more particularly to FIGS. 1 through 14, where similar reference characters denote corresponding features consistently throughout the figures, there are shown preferred embodiments.

FIG. 1 illustrates a system view 100 of a user 102 communicating with a user system 104 to generate a summary using a content summarization engine 106 according to an embodiment herein. In one embodiment, the user system 104A-N may be a personal computer (PC) 104A, a tablet 104B and/or a smart phone 104N. The content summarization engine 106 summarizes content.

Figure 2:
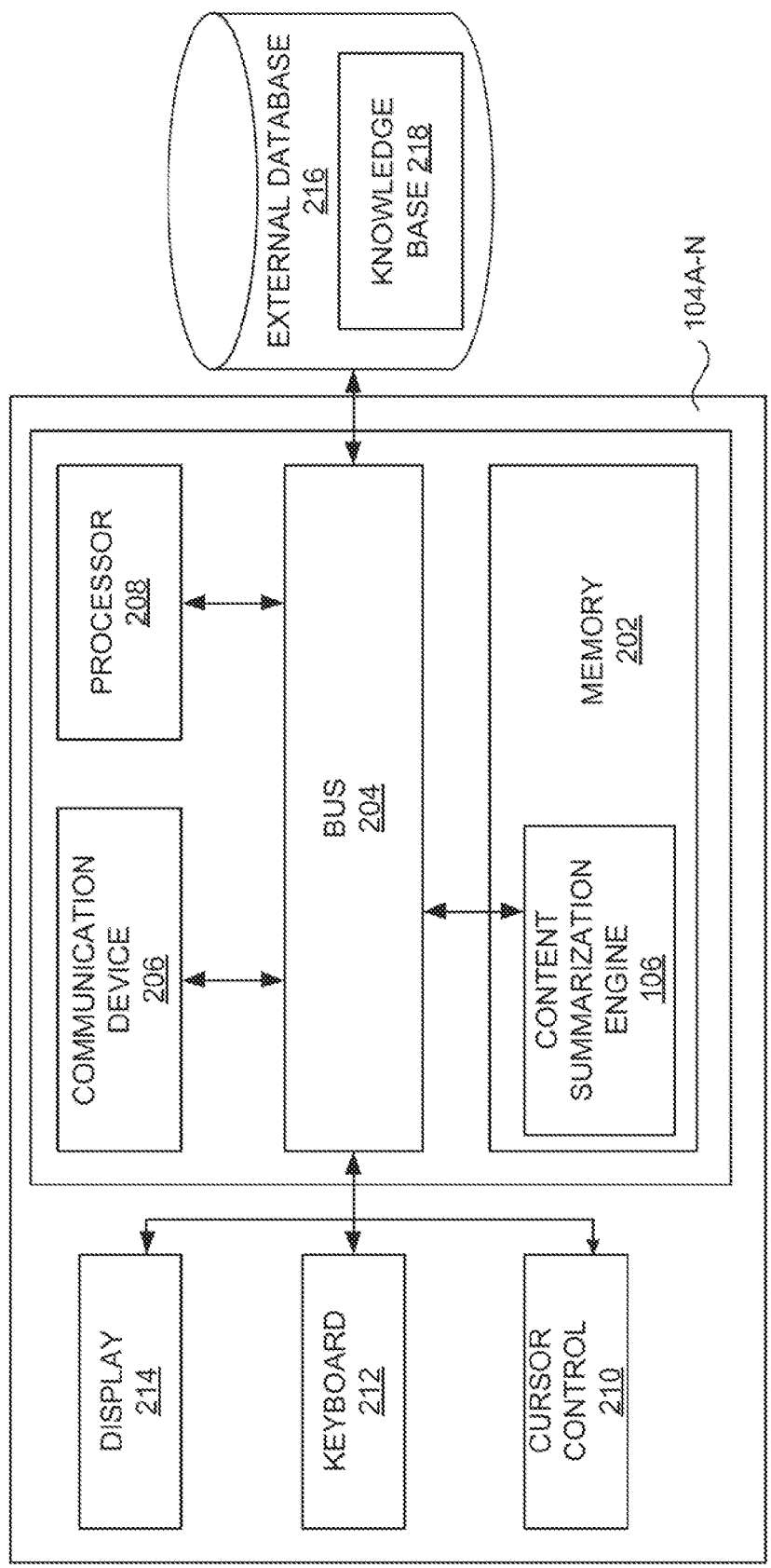
FIG. 2 illustrates an exploded view of the user system with a memory storage unit for storing the content summarization engine of FIG. 1, and an external database according to an embodiment herein.

FIG. 2 illustrates an exploded view of the user system 104A-N with a memory storage unit 202 for storing the content summarization engine 106 of FIG. 1, and an external database 216 according to an embodiment herein. The user system 104A-N includes the memory storage unit 202, a bus 204, a communication device 206, a processor 208, a cursor control 210, a keyboard 212, and a display 214. The memory storage unit 202 stores the content summarization engine 106 that includes one or more modules to perform various functions on an input content and generates a summary intent surrounding the input content. The external database 216 includes a knowledge base 218 that is constructed based on concepts of linked data. The knowledge base 218 includes a set of categories that correspond to various keywords.

Figure 3:
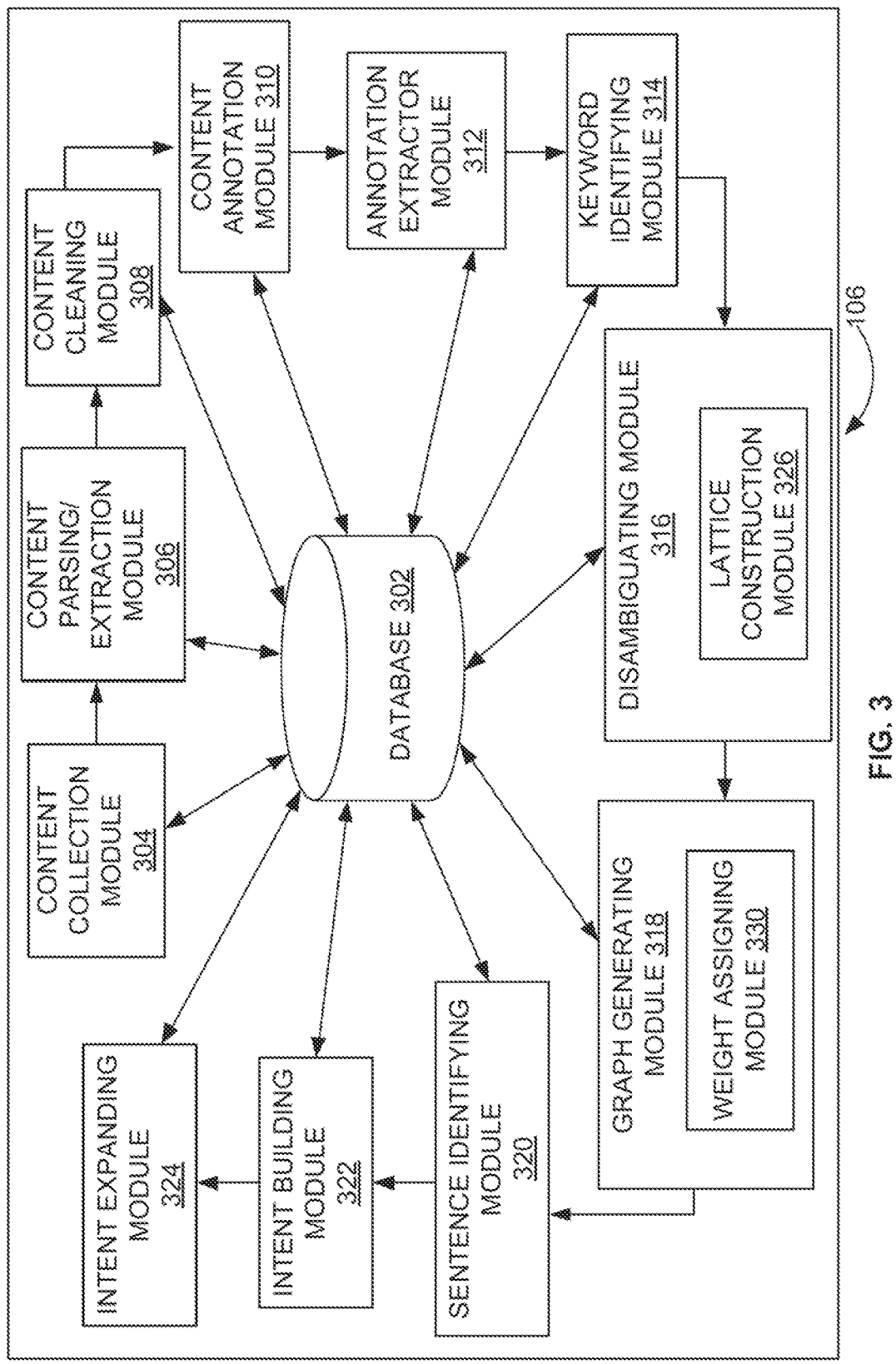
FIG. 3 illustrates an exploded of the content summarization engine of FIG. 1 according to an embodiment herein.

FIG. 3 illustrates an exploded view of the content summarization engine 106 of FIG. 1 according to an embodiment herein. The content summarization engine 106 includes a database 302, a content collection module 304, a content parsing/extraction module 306, a content cleaning module 308, a content annotation module 310, an annotation extractor module 312, a keyword identifying module 314, a disambiguating module 316, a graph generating module 318, a sentence identifying module 320, an intent building module 322, and an intent expanding module 324.

The content collection module 304 collects content from at least one format of text (e.g., including multiple different documents of different formats) provided by the user 102. Such formats may include, for example, .doc, .pdf, .rtf, a URL, a blog, a feed, etc. The content extraction/parsing module 306 fetch the content from these one or more documents (e.g. abc.doc, xyz.pdf, etc), and provide the content require to generate a summary. Further, the content extraction/parsing module 306 parses HTML content in case one of the sources of input is a URL. The content cleaning module 308 cleans the content that may include removal of junk characters, new lines that are not useful, application specific symbols (e.g., MS Word bullets), non-unicode characters, etc. In one embodiment, specific parts of a document (e.g., footer) are specified as to be excluded. Such exclusions can be specified based on a type of content that is provided (e.g., news article, resume etc), and the content cleaning module 308 is configurable accordingly.

The content annotation module 310 annotates the content for useful information, such as sentences, keywords, tokens, sentiments, durations, sections, durations within the sections, quantities, sentences associated with the sections, and sentences associated with durations and quantities. The annotation extractor module 312 extracts annotated information from the content annotation module 310. The keyword identifying module 314 identifies one or more keywords associate with the content based on the content annotation module 310. The disambiguating module 316 disambiguates at least one ambiguous keyword from the one or more keywords in a context of its meaning using weighted formal concept analysis (wFCA). The disambiguating module 316 further includes a lattice construction module 326 that generates a lattice to disambiguate the at least one ambiguous keyword. The lattice includes one or more concepts that are generated based on the one or more keywords, and categories associated with the one or more keywords. In one embodiment, the disambiguating module 316 further includes a score computing module 328 (not shown in the FIG. 3) that computes a score for each concept of the one or more concepts. The score is used to disambiguate the at least one ambiguous keyword.

The graph generating module 318 constructs/generates a graph to obtain an association between sentences, between keywords and sentences, and between sentences and durations. In one embodiment, the graph includes one or more nodes, and each node corresponds to a sentence of the content. The graph generating module 318 includes a weight assigning module 330 that assigns a weight to each sentence of the content. The sentence identifying module 320 identifies one or more sentences that are related to a keyword when the user 102 intent is summarization around the keyword. The intent building module 322 generates a summary by tailoring one or more sentences in the same exact order as it appears in the content. In one embodiment, the intent building module 322 tailors the one or more sentences based on the weight assigned for each sentence of the content. The intent expanding module 324 expands the summary while preserving intent and elaborating further.

Figure 4:
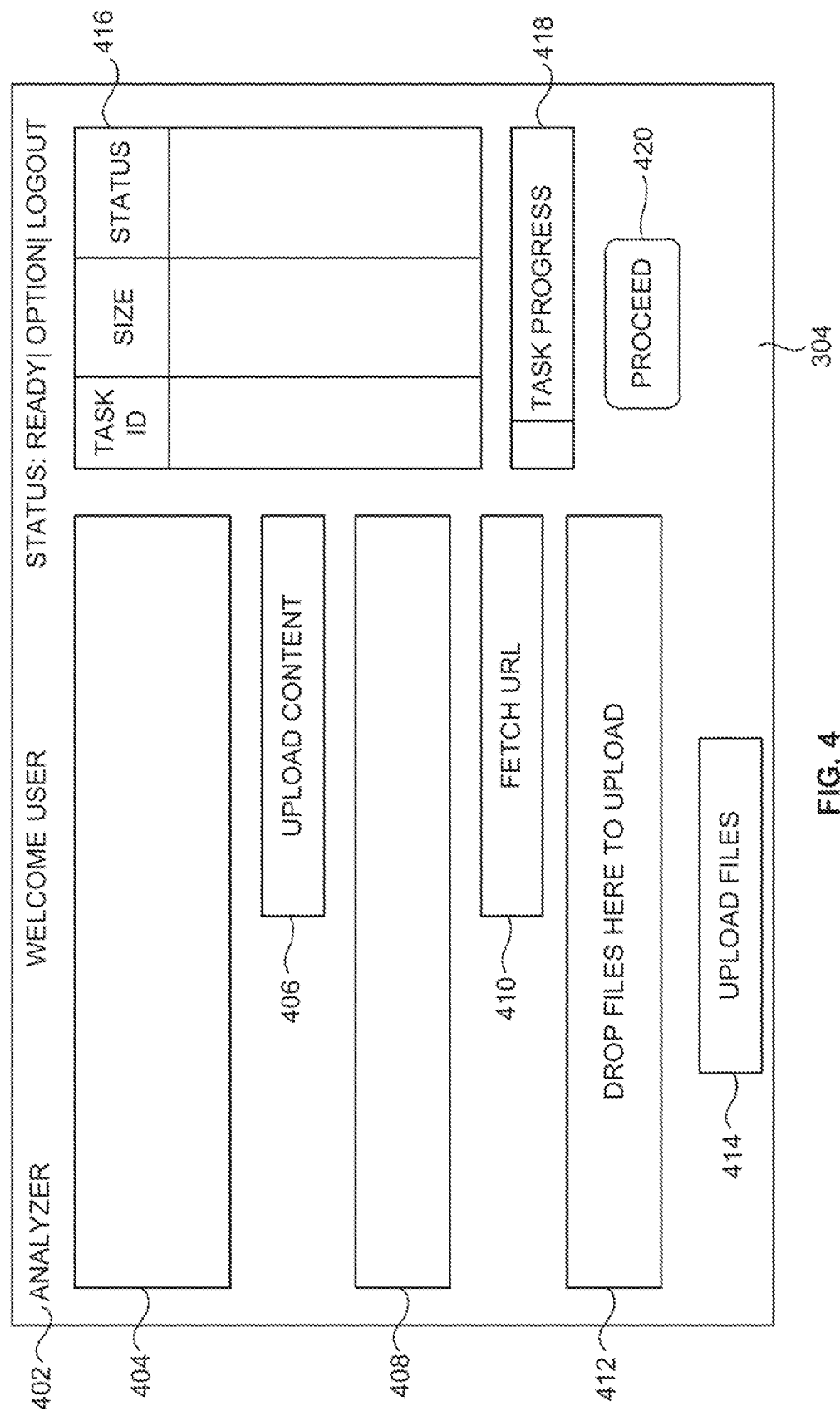
FIG. 4 illustrates a user interface view of the content collection module of FIG. 3 of the content summarization engine of FIG. 1 according to an embodiment herein.

FIG. 4 illustrates a user interface view of the content collection module 304 of FIG. 3 of the content summarization engine 106 of FIG. 1 according to an embodiment herein. The user interface view of the content collection module 304 includes a header 402, a text field 404, an upload button 406, an URL text field 408, a fetch button 410, a drag and drop field 412, an upload file button 414, a task status table 416, a task progress field 418, and a proceed button 420. The header 402 displays a logo, a welcome message, and a status of an application. Through, the text field 404, the user 102 can provide a plain text to be summarized, and submits the plain text to a server, using the upload button 406. The plain text may also be provided as a uniform (or universal) resource locator (URL) in the URL text field 408, and text associated with the URL is crawled using the fetch button 410. The drag and drop field 412 is used to drag and drop any files with text to be uploaded. Through, the upload file button 414, the user 102 can browse a file to be uploaded. The task status table 416 displays uploaded text, the URL and/or the file. The task progress field 418 notifies the user 102 about progress of a summarization process for each uploaded content, and the proceed button 420 directs the user 102 to a next page.

FIG. 5 illustrates a user interface view 500 of an input content 502 to be summarized using the content summarization engine 106 of FIG. 1 according to an embodiment herein. The input content 502 may be obtained in the form of a document, an URL, and/or plain-text as specified by the user 102 using the content collection module 304. The content collection module 304 collects the input content 502 and stores it on the server.

In one embodiment, the input content 502 is collected from one or more documents (e.g., abc.doc, and/or xyz.pdf), and are parsed/extracted (e.g., using the content parsing/extraction module 306 of FIG. 3). In another embodiment, the input content 502 may be fed as an URL (e.g., www.xyzairlines.com/content.html). The content collection module 304 fetches the content associated with the URL, and parses/extracts using the content parsing/extraction module 306. The content summarization engine 106 obtains the input content 502 to generate a summary on the input content 502.

The content cleaning module 308 cleans the input content 502 before performing annotation. Cleaning the content includes removing junk characters, new lines that are not useful, application specific symbols (word processing bullets, etc.), and/or non-Unicode characters, etc. The input content 502 may be in a form of a cleaned text which does not require removing (i) junk characters, (ii) new lines that are not useful, (iii) application specific symbols (word processing bullets, etc.), and/or (iv) non-Unicode characters, etc., in one example embodiment.

Figure 6:
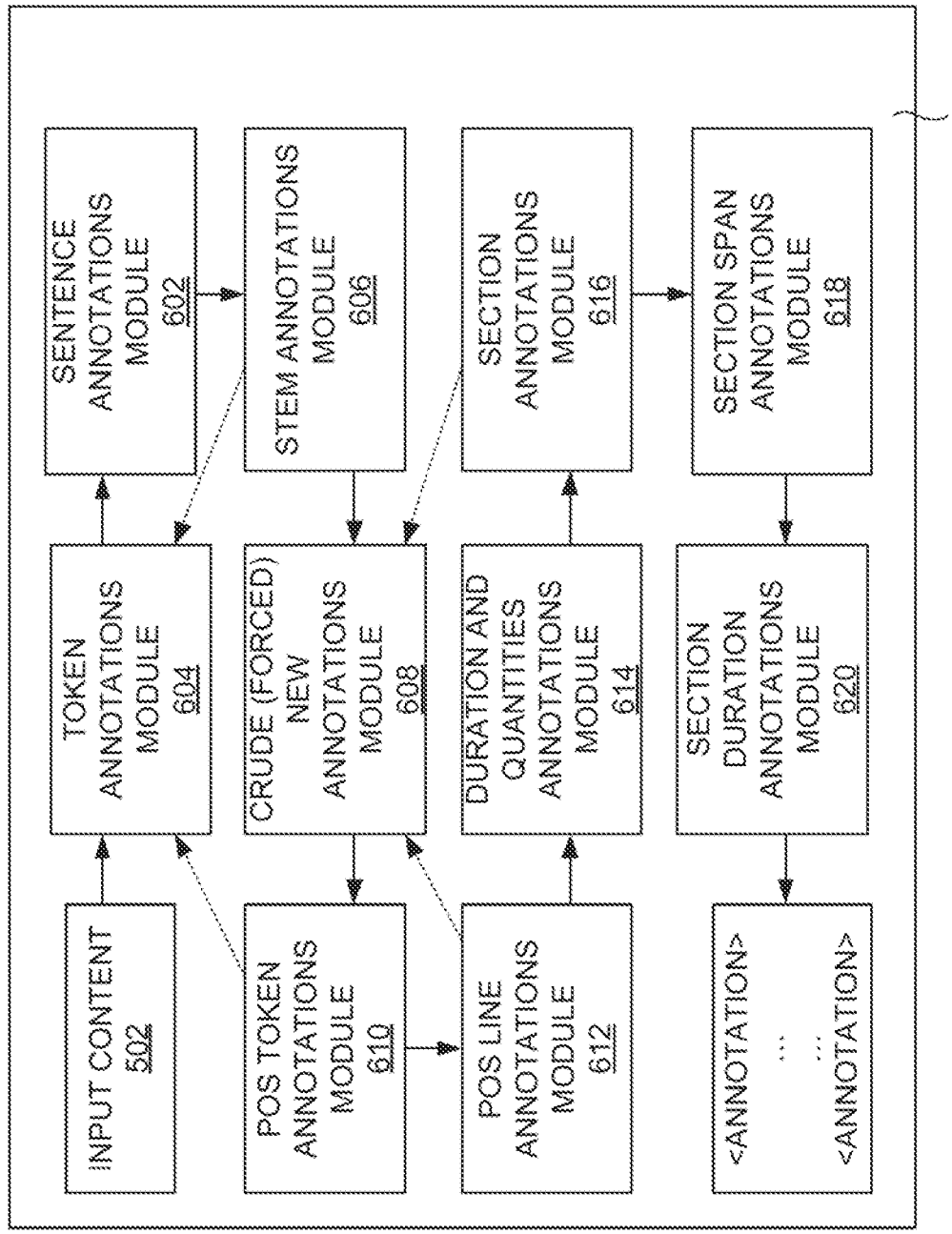
FIG. 6 illustrates an exploded view of the content annotation module of FIG. 3 of the content summarization engine of FIG. 1 according to an embodiment herein.

FIG. 6 illustrates an exploded view of the content annotation module 310 of FIG. 3 of the content summarization engine 106 of FIG. 1 according to an embodiment herein. The content annotation module 310 annotates the input content 502 for useful information. The content annotation module 310 includes a sentence annotations module 602, a token annotations module 604, a stem annotations module 606, a forced new lines, paragraphs and indentations computing module 608, a parts of speech tag (POS) token annotations module 610, a POS line annotation module 612, a duration and quantities determining module 614, a section annotations module 616, a section span annotations module 618, and a section duration annotation module 620. The dotted lines (arrows having a dotted line property) of FIG. 6 represent internal dependencies among various modules, and whereas the solid lines (arrows having a solid line property) represent the flow of annotation process.

After parsing and cleaning the input content 502, a cleaned content is annotated by performing various levels of annotations using sub-modules of the content annotation module 310. The sentence annotations module 602 extracts each and every sentence in the input content 502. For example, a first sentence of the input content 502 may be extracted by the sentence annotations module 602 includes "REUTERS—The chairman of Kingfisher Airlines, Vijay Mallya, said in an interview with the Financial Times he was close to sealing a $370 million deal with an Indian private investor and a consortium of banks that would save the airline."

Similarly, the sentence annotations module 602 extracts all the sentences of the input content 502.

The token annotations module 604 determines each and every token in the sentences of the input content 502. For example, "The", "chairman", "of", "kingfisher", "airlines", "vijay", "mallya", "said", "in", "an "interview", "with" are all tokens in a first line of the input content 502. The stem annotations module 606 computes a root word for each and every token identified by the token annotations module 604. For example, "reuter—the chairman of kingfish airlin, vijay mallaya, said in an interview with 370 million deal with an indian privat investor and a consortium of bank that would save the airlin."

The forced new lines, paragraphs and indentations computing module 608 determines white spaces like new lines that are forced (an enter received, a list of sentences that are not properly phrased), paragraphs, and/or indentations, etc. It is used to extract new lines, and sentences separately as content in the case of documents like feeds and tweets which most often do not follow the language semantics. Such documents may also contain sentences that are not phrased correctly. In such cases, the extraction of new lines and one or more sentences are more valuable. The POS token annotations module 610 generates one or more parts of speech (POS) tag such as a noun, a verb, etc. for each token in the sentences such that each token annotation has an associated POS tag. Further, POS line annotations module 612 tag each token in the new lines as a noun, or a verb, etc. In addition, the new lines are also useful for section extraction because section names may not be proper sentences. For example, in the input content 502, "Shares" and "Introduction" are not proper sentences but a word, and they are captured using the section annotations module 616 as a new line because they occur in a separate line.

The duration and quantities determining module 614 extracts duration and quantities wherever it occurs in a text of the input content 502. For example, it extracts duration, like "2008, "2005" and quantities like "64 percentage" from the input content 502. The section annotations module 616 determines a group of sentences that form a section that has a heading. To determine a start and an end point of the section, various heuristics are used that includes lookup for well known sections, sentence construction based on the parts of speech, relevance with respect to surrounded text, exclusion terms, term co-occurrence, etc.

In one embodiment, the user 102 can specify a section name of the input content 502 around which a summary has to be generated. For example, from the input content 502, two sections names are extracted such as "introduction" and "shares". The user 102 can obtain information from the content associated with any of these two sections by using the section span annotations module 618. The section duration annotations module 620 determines one or more durations that appear in the section specified by the user 102, and text associated with the one or more durations. If the user 102 does not specify the section name, a summary may be generated for an entire content.

Once annotations are done, the annotation extractor module 312 extracts all the required artifacts from the annotations.

The annotation extractor module 312 extracts one or more sentences, one or more keywords, one or more sections, duration within the section, one or more spans of duration, etc. occurred within the input content 502, and provides to the user 102 for an intent selection.

Figure 7:
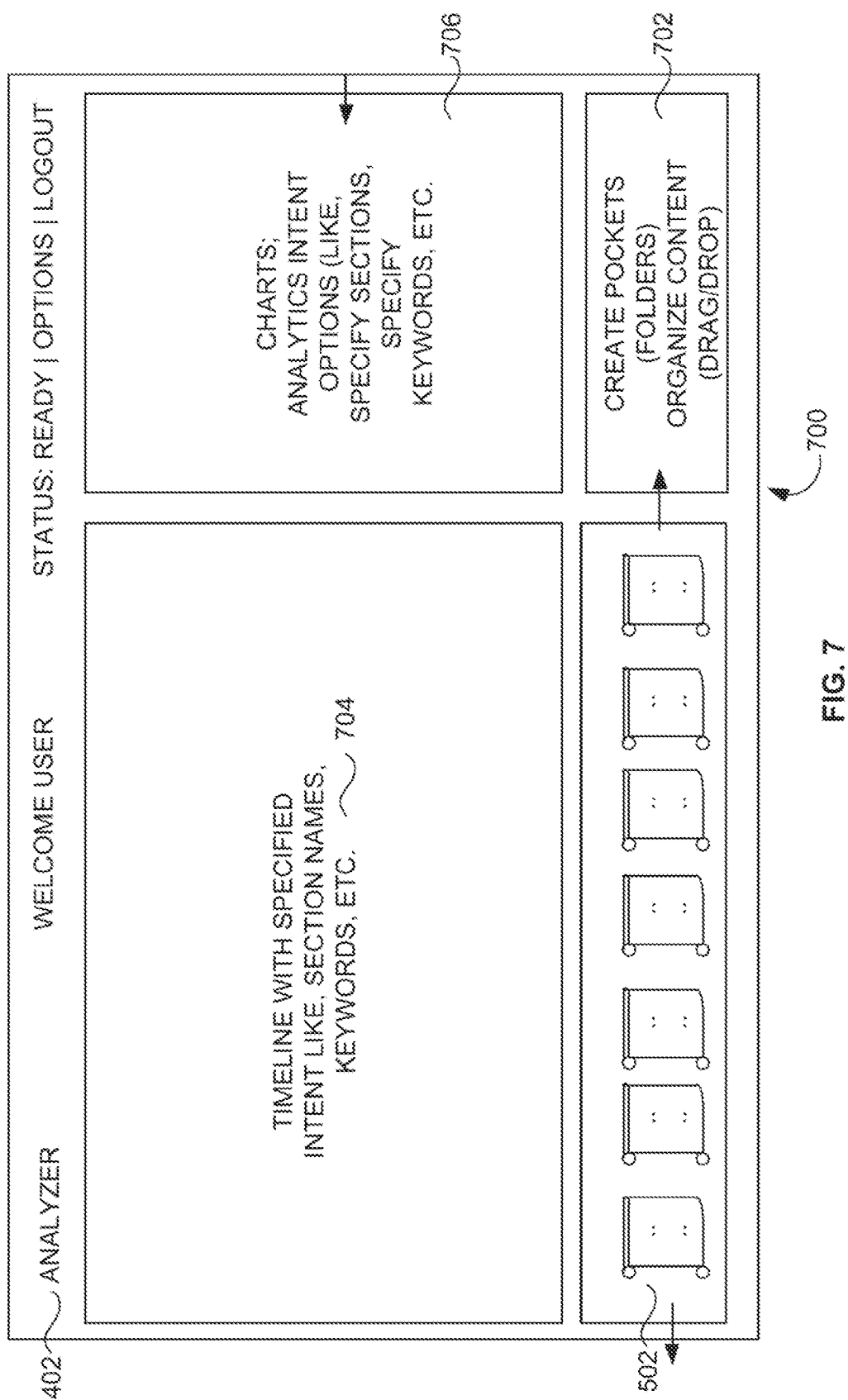
FIG. 7 illustrates a user interface view of intent selection by the user of FIG. 1 according to an embodiment herein.

FIG. 7 illustrates a user interface view 700 of an intent selection by the user 102 of FIG. 1 according to an embodiment herein. The user interface view 700 of the intent selection includes the header 402, the input content 502, a create folder(s) or organize content button 702, an intent analytics field 704, and an intent selection field 706. In one embodiment, the input content 502 may be obtained from one or more documents (e.g., an uploaded content). These documents may be listed and/or displayed as one or more scrollable lists (e.g., a left to right scrollable list, a right to left scrollable list, an up to down scrollable list, and/or a down to up scrollable list). The create folder(s) or organize content button 702 is used for organizing those contents, and enables to create new folders, where the content from the scrollable lists can be dragged and dropped to a required folder to organize them. The intent analytics field 704 displays an analysis for the input content 502 which is selected from the scrollable lists. The analysis includes, but not limited to sections, summary, identified keywords, and other details such as duration information. The intent selection field 706 provides one or more options to specify various intents (analysis) around which summarization are to be done. In one embodiment, the user 102 can specify a section, and/or a page of a document that includes content to be summarized. In another embodiment, the user 102 specifies a keyword around which summarization of content needs to be done. In yet another embodiment, the user 102 specifies an overall summarization when the user 102 intents to summarize entire content.

Figure 8:
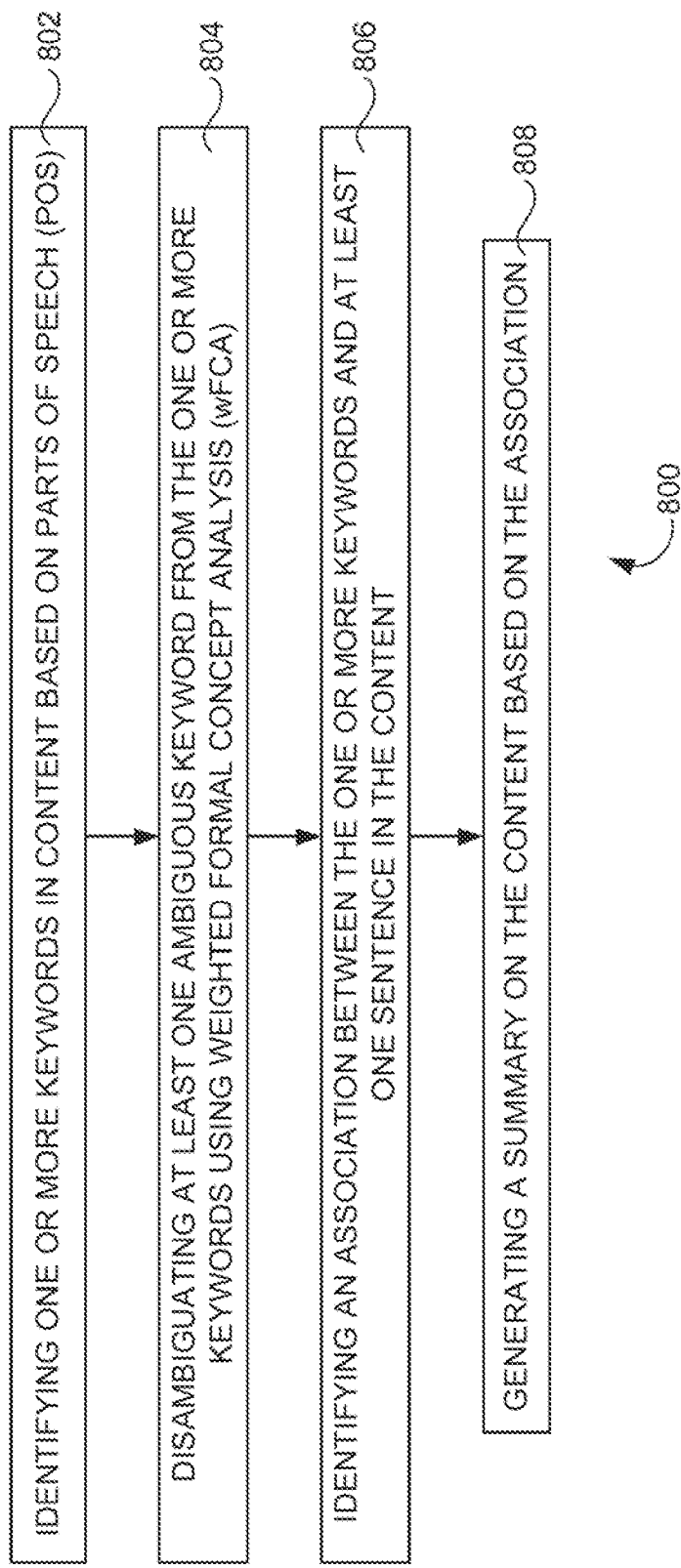
FIG. 8 is a flow diagram illustrating summarizing of content using weighted Formal Concept Analysis (wFCA) according to an embodiment herein.

FIG. 8 is a flow diagram 800 illustrating summarizing of content using weighted Formal Concept Analysis (wFCA) according to an embodiment herein. The flow diagram 800 provides a method for an overall summarization, a section wise summarization, or a page-wise summarization of the content. The method includes: In step 802, identifying one or more keywords in the content based on parts of speech (POS) occurs. In one embodiment, the keyword identifying module 314 identifies the one or more keywords based on Parts of speech (POS) tagged by the POS token annotations module 610, and/or the POS line annotations module 612 of FIG. 6. In step 804, disambiguating at least one ambiguous keyword from the one or more keywords using wFCA occurs. Disambiguating of the at least one ambiguous keyword occurs by generating a lattice using the lattice construction module 326. The lattice includes one or more concepts which are generated with the one or more keywords as objects, and categories associated with the one or more keyword as attributes. The categories are obtained from the knowledge base 218 of FIG. 2.

In step 806, identifying an association between the one or more keywords and at least one sentence in the content occurs. In one embodiment, the association is identified by generating a graph which includes one or more nodes. Each node indicates a sentence in the content. The weight assigning module 330 assigns a weight to a sentence of the content based on a count that corresponds to the one or more keywords associate with a node that corresponds to the sentence. Similarly, a weight is assigned for each sentence of the content. In step 808, generating a summary on the content based on the association occurs. When the user 102 intents to expand the summary, the content summarization engine 106 expands the summary based on the weight assigned for each sentence of the content.

For example, from the input content 502, the one or more keywords are identified and extracted based on parts of speech (POS) tag generated by the POS token annotations module 610, and/or the POS line annotations module 612. For instance, a noun is very likely to be a keyword in a sentence. Similarly co-occurring nouns and its derivatives are also a keyword. A keyword chunker is used to obtain these keywords and keyword phrases depending on the noun and related tags. In one embodiment, when the user 102 does not specify a section of the input content 502, then entire input content 502 is summarized. The annotation extractor module 312 extracts the one or more keywords (e.g., 6 keywords) using POS tag. For instance, the extracted keywords are:

reuters—POS Tag says that it is a noun
chairman—POS Tag says that it is a noun
Kingfisher Airlines—POS Tag says that it is a noun followed by a noun (phrase)
Vijay Mallya—POS Tag says that it is a noun followed by a noun (phrase)
Shares—POS Tag says that it is a noun
Kingfisher—POS Tag says that it is a noun Once these keywords are identified and extracted, they need to be disambiguated to find right meaning in which the one or more keywords are used in the input content 502. To disambiguate, the content summarization engine 106 determines different disambiguated terms from the one or more keywords, and their related categories. Further, the content summarization engine 106 uses the knowledge base 218 stored in the external database 216 for obtaining categories for the one or more keywords. Each keyword is queried separately against the knowledge base 218 and corresponding categories are obtained. For example, for the above keywords, the categories obtained are REUTERS—{Society, Corporate Groups, Organizations, Organizations by type, Agencies, News agencies}
chairman—{Business, Management, Management occupations}
Kingfisher Airlines—{Business, Industry, Service Industries, Travel, Transportation, Transport by mode, Aviation, Aviation by Continent, Aviation in Asia, Aviation in India, Airlines of India}
Vijay Mallya—{Business, Management, Management occupations, Business executives, Chief executives, Chief executives by nationality, Indian chief executives}
Shares—{Business, Finance, Financial Economics, Financial markets, Stock market, Share (finance)}
Kingfisher—{Nature, Natural Sciences, Biology, Zoology, Animals, Chordates, Vertebrates, Birds, Birds by common name, Kingfishers}

For example, the keyword "kingfisher" has got two disambiguations (e.g., one for "Kingfisher (Bird)" and one for "Kingfisher Airlines". The categories corresponding to each word are shown against them. In one embodiment, the categories may be modified by the user 102. The modification is taken as a feedback to the categories suggested for the keywords and is used to train the knowledge base 218 for preferred categories. In order to disambiguate the keyword "kingfisher" and to compute a context in the right meaning, the content summarization engine 106 uses the lattice construction module 326. The lattice construction module 326 constructs a lattice based on the weighted Formal Concept Analysis (wFCA).

Figure 9:
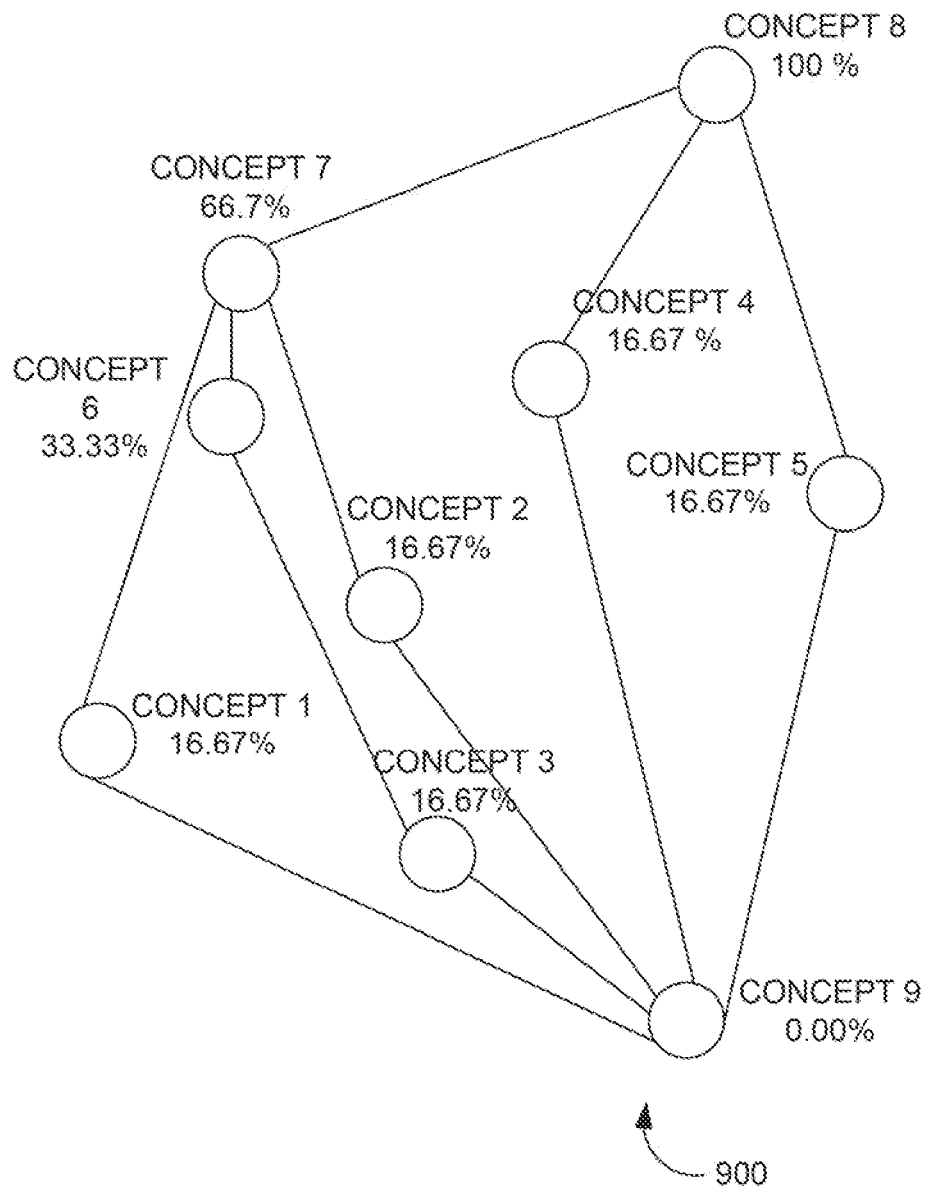
FIG. 9 illustrates a graphical representation of a lattice that is generated to disambiguate a keyword "kingfisher" of the input content using the lattice construction module of FIG. 3 according to an embodiment herein.

FIG. 9 illustrates a graphical representation 900 of a lattice that is generated to disambiguate a keyword "kingfisher" of the input content 502 using the lattice construction module 326 of FIG. 3 according to an embodiment herein. The lattice construction module 326 forms various concepts with one or more keywords, and their associated categories. For example, concept-1 to concept-9 associated with FIG. 9 are:

Concept-1: [Kingfisher Airlines]: [Aviation in India, Travel, Aviation, Transport by mode, Aviation by Continent, Transportation, Business, Aviation in Asia, Service Industries, Airlines of India, Industry]
Concept-2: [Shares]: [Finance, Business, Share (finance), Financial Economics, Stock market, Financial markets]
Concept-3: [Vijay Mallya]: [Management occupations, Management, Business, Chief executives, Business executives, Indian chief executives, Chief executives by nationality]
Concept-4: [Kingfisher]: [Animals, Zoology, Natural Sciences, Chordates, Vertebrates, Birds, Birds by common name, Kingfishers, Nature, Biology]
Concept-5: [REUTERS]: [Society, Organizations by type, Agencies, Organizations, Corporate Groups, News agencies]
Concept-6: [chairman, Vijay Mallya]: [Management occupations, Management, Business]
Concept-7: [chairman, Kingfisher Airlines, Shares, Vijay Mallya]: [Business]
Concept-8: [ ]: [Aviation in India, Society, Travel, Animals, Management, Management occupations, Organizations, Chief executives, Indian chief executives, Corporate Groups, Share (finance), Financial Economics, Chordates, Airlines of India, Transport by mode, Transportation, Agencies, Aviation in Asia, Aviation, Organizations by type, Zoology, Aviation by Continent, Business, Finance, Business executives, Natural Sciences, News agencies, Chief executives by nationality, Birds by common name, Nature, Service Industries, Stock market, Vertebrates, Birds, Financial markets, Kingfishers, Industry, Biology]
Concept-9: [chairman, Kingfisher Airlines, Shares, Kingfisher, Vijay Mallya, REUTERS]: [ ]

In one embodiment, the lattice construction module 326 interprets that the concept 4 "Kingfisher" is not associated with any other concept and there are no matching contexts. Whereas, the concept 1 "Kingfisher Airlines" is associated with the concept 3 "Vijay Mallya", the concept 2 "shares" and the concept 6 "chairman", and it also has an overlapping context "business" (concept 7). Thus the word kingfisher is treated as "Kingfisher Airlines" and not "Kingfisher (bird)".

Further, concept 1 to concept 5 defines distinct category sets for each keyword. The keyword "chairman" does not have a distinct concept because it is a subset of the category set of the keyword "Vijay Mallya". This implies that the keywords "chairman" and "Vijay Mallya" are strongly related in a context of the input content 502. In addition, the concept 6 and concept 7 provide contextual information that the keywords "chairman", "Kingfisher Airlines", "Shares" and "Vijay Mallya" are related in the context of the input content 502. The keyword "reuters" and "Kingfisher" are not related to any other keywords and are treated as an unimportant (less priority) in the context of the input content 502, and there is no concept that covers all the categories.

The score computing module 328 computes a score (shown in the percentage) for each node or concept in FIG. 9 using the weighted FCA. A simple heuristic model of the weighted FCA computes score of the nodes, and a node with highest score is used to disambiguate a keyword in the context of right meaning. For computing score, the heuristic may assign equal probability for all six keywords. Hence, there are totally 6 keywords having a score of ⅙ each. The concept 1 to concept 5 defines a distinct category set for each keyword. Therefore, the score for each keyword of concept 1 to concept 5 is 1/6 (16.67%).

However, as described the keyword "chairman" does not have a distinct category because it is a subset of the category set of keyword "Vijay Mallya". Such categories are "Management occupations", "Management" and "Business". Further, this categories are common for both keyword chairman" and "Vijay Mallya" and hence they are strongly associated in the context of the input content 502. This makes the concept 6. Further, a score for the concept 6 is (1/6)*2 which is 33.33%.

In addition, a category "business" is associated with the categories of the concept 2. Thus, the keywords "kingfisher Airlines", "shares", "vijay Mallya", "chairman" is strongly associated with the category business. This makes the concept 7. The score for the concept 7 will be (1/6)*4 which is 66.67%. Hence, the keyword "kingfisher Airlines" as described is strongly associated with the category "business". Thus, the keyword "kingfisher" is treated as "kingfisher Airlines" and not as "kingfisher (bird)" by using weighted FCA.

In one embodiment, the weighted FCA can be further drilled down to provide more precise results and are often useful to obtain more contextual information that are useful for disambiguation. In one embodiment, using the weighted FCA, the disambiguation is done by treating all the categories at the same level and ignoring hierarchy. Whereas, in drill down FCA all the associated categories form a hierarchy in the knowledge base 218.

For example, consider the hierarchy for Chairman, Kingfisher Airlines and Vijay Mallya.

Chairman—Business->Management->Management occupations}

Kingfisher Airlines—{Business->Industry->Service Industries->Travel->Transportation->Transport by mode->Aviation->Aviation by Continent->Aviation in Asia->Aviation in India, Airlines of India}

Vijay Mallya—{Business->Management->Management occupations->Business executives->Chief executives->Chief executives by nationality->Indian chief executives}

In first level, the weighted FCA, i.e. considering the root element "business", the weight for all three keywords in the concept is (1/3)*3=1.0. Hence, in the context of "business" all are related. But, using the drill down FCA, if the "Business" category is drilled down to a set of categories such as {Business, Management, Industry}, two drill down concepts will be obtained with respect to the three concepts.

Concept-10: [chairman, Vijay Mallya]: [Business, Management] Weight: 2/3~0.67

Concept-11: [Kingfisher Airlines]: [Business, Industry] Weight: 1/3~0.33

By performing the drill-down FCA with the subset of categories, contextual information is obtained. The contextual information indicates an affinity among the keywords "chairman", "Kingfisher Airlines" and "Vijay Mallya". For instance, from the concept 10 and concept 11 shows that although "chairman", "Kingfisher Airlines" and "Vijay Mallya" are related in a context of "Business", but "Kingfisher Airlines" is a different concept in a context of "Business" with respect to "Industry", whereas, "chairman" and "Vijay Mallya" are related in a context of "Business" with respect to "Management". Similarly, the drill down FCA can be performed until all the contextual information is retrieved and the disambiguation is achieved. Further, the content summarization engine 106 accepts the input content 502 at the disambiguation step as well and the user 102 can correct the incorrect associations by viewing at alternative category associations.

In an embodiment, the user 102 may also disambiguate one or more keywords in the context of right meaning using popularity of the one or more keywords. In yet another embodiment, the user 102 is provided with a graphical representation for visualizing summarization around the one or more keywords. The user 102 can view a graph having the one or more keywords around which related text such as keywords, sentences, and/or content are associated. Once disambiguation is over, the content summarization engine 106 has one or more disambiguated keywords to generate a content graph.

Figure 10:
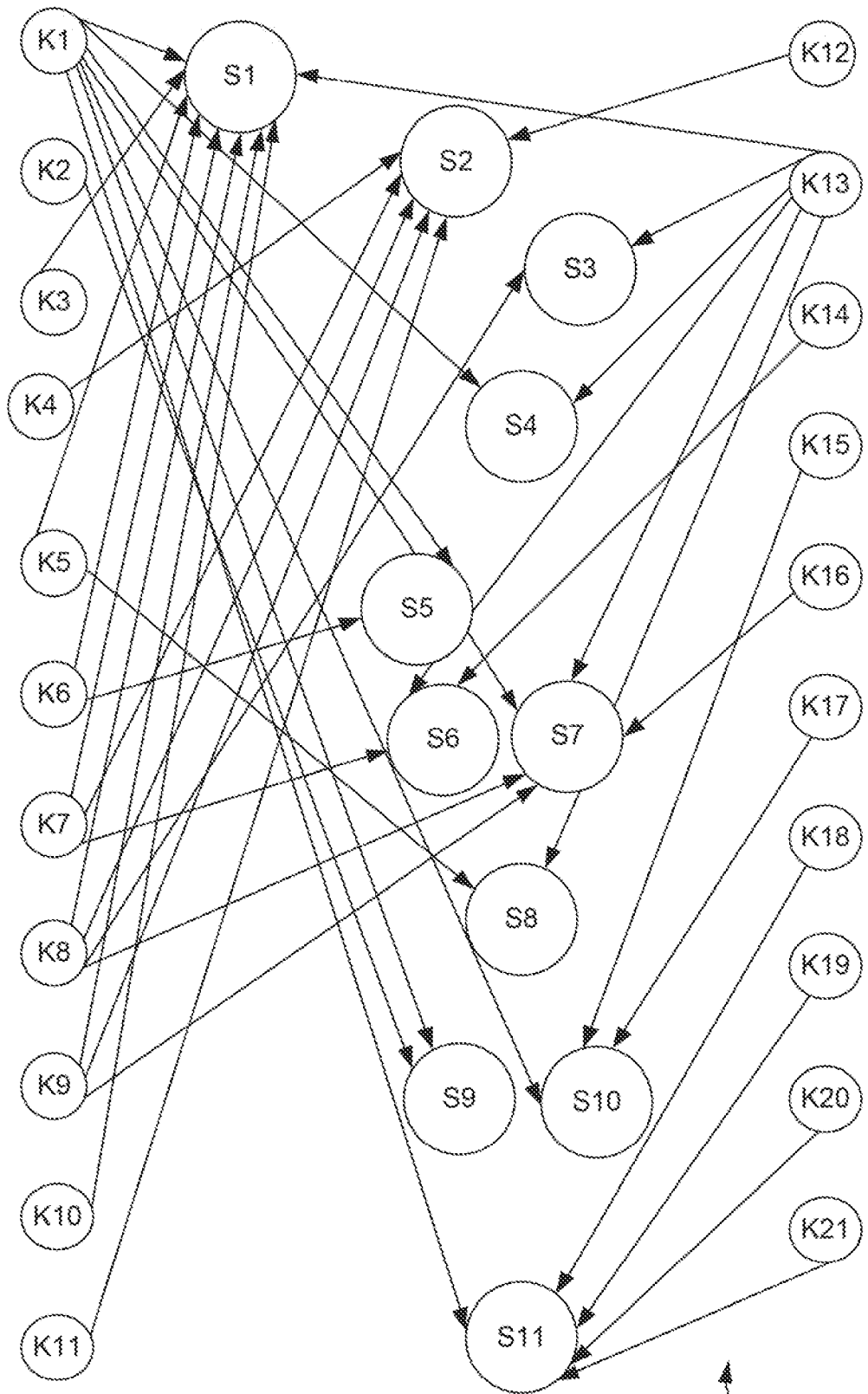
FIG. 10 is a graphical representation illustrating a graph that indicates an association between one or more keywords and sentences of the input content of FIG. 5 according to an embodiment herein.

FIG. 10 is a graphical representation illustrating a graph 1000 that indicates an association between one or more keywords and sentences of the input content 502 of FIG. 5 according to an embodiment herein. The graph generating module 318 generates the graph 1000 with the sentences and their associated keywords. The graph 1000 includes one or more nodes, and each node corresponds to a sentence of the input content 502. The graph 1000 further includes one or more keywords of the input content 502 identified by the keyword identifying module 314.

For example, the graph 1000 is generated for the input content 502 with sentences S1, S2, S3, S4 S5, S6, S7, S8, S9, S10, and S11 associated with the keywords K1, K2, K3 . . . and K21 such as, K1: Kingfisher Airlines
K2: Shares
K3: chairman
K4: State bank of India
K5: Reuters
K6: Investor
K7: Financial times
K8: Banks
K9: Deal
K10: Interview
K11: Bangalore
K12: Entrepreneur
K13: Vijay Mallaya
K14: Equity/Equity injection
K15: Market value
K16: Debt
K17: Profit
K18: Economy
K19: Aircraft
K20: Fuel
K21: Causalities
S1: REUTERS—The chairman of Kingfisher Airlines, Vijay Mallya, said in an interview with the Financial Times he was close to sealing a $370 million deal with an Indian private investor and a consortium of banks that would save the airline.
S2: The Bangalore-based entrepreneur told the FT he was nearing a deal with 14 banks led by State Bank of India that would provide the loss-making carrier with working capital of 6 billion rupees.
S3: He did not name the banks.
S4: Earlier this week, Kingfisher said its net loss for the September quarter doubled but Mallya offered little to revive its finances.
S5: It had also said it had been approached by strategic investors.
S6: Mallaya, a flamboyant liquor baron who owns a Formula One Motor-racing team, told the paper he was finalizing a separate $250 million equity injection from an unnamed wealthy Indian individual to recapitalize the cash-strapped carrier.

S7: He added that he was about to conclude a deal with the banks to reduce the interest rate which the airlines is currently paying on its $1.4 billion debt pile S8: Mallaya said on the social networking site Twitter that the report was "factually wrong" but he did not elaborate Reuters could not immediately reach company officials for a comment.

S9: Shares kingfisher which is named after its best selling beer, were down more than 5 percentage in early trade on Friday in Mumbai.

S10: Kingfisher, which listed when it bought out budget airline, Air Deccan in 2008, has never made a profit and its market value has plunged 64 percentage this year.

S11: The airlines become No. 2 private carrier since it began its operations in 2005 as the economy boomed but has become one of the main causalities of high fuel costs and a fierce price war between a handful of airlines which, between them, have ordered hundreds of aircraft on delivery over the next decade in an ambitious bet on the future.

For instance, all the keywords K1, K2, K3, . . . and K21 have an equal weight of ½₁ (i.e., 0.04762). However, based on number of associations of each keyword with the sentences, the actual weight may vary. For example, the keyword K1 "kingfisher Airlines" is associated with S1 directly, also indirectly with S4, S5, S9, and S10 as "kingfisher", and with S7, S10, and S11 as "Airline or Airlines". The keyword "kingfisher" is treated here as "kingfisher Airlines" as already disambiguated. The keyword "kingfisher Airlines" is thus associated 7 sentences. Hence, a weight for the keyword K1 "kingfisher Airlines" computed as 0.04762/7. Similarly, a weight is computed for each keyword based on number of associations.

Figure 11:
FIG. 11 is a table view illustrating a weight that is computed for each keyword that is identified by the keyword identifying module of FIG. 3 based on number of associations of each keyword with sentences of the input content according to an embodiment herein.

FIG. 11 is a table view 1100 illustrating a weight 1102 that is computed for each keyword that is identified by the keyword identifying module 314 of FIG. 3 based on number of associations 1104 of each keyword with sentences of the input content 502 according to an embodiment herein. As described, computing the weight for the keyword K1 "kingfisher Airlines" based on number of associations of the keyword K1 with sentences of the input content 502, a weight is computed for each keyword as shown in the table.

Once the weight is computed for each keyword, the weight assigning module 330 assigns a weight for a sentence in the input content 502 based on a count that corresponds to the keywords associated with a node that corresponds to the sentence using simple heuristics. Similarly, a weight is computed for each sentence of the input content 502. For example, a weight for the first sentence S1 is computed based on a count that correspond to the keywords associate with a node that corresponds to the first sentence S1. Such keywords that associate with the first sentence S1 are K1, K3, K5, K6, K7, K8, K9, K10, and K13. The weight for the first sentence S1 is computed as summation of weights associate with the keywords that corresponds to the first sentence S1.

Thus,

Weight of $S1$ = (Weight of $K1$) + (Weight of $K3$) + (Weight of $K5$) +

(Weight of $K6$) + (Weight of $K7$) + (Weight of $K8$) +

(Weight of $K9$) + (Weight of $K10$) + (Weight of $K13$)

-continued
= (0.04762/7) + (0.04762) + (0.04762/2) + (0.04762/2) +

(0.04762/3) + (0.04762/4) + (0.04762/3) + (0.04762) +

(0.04762/6)

= 0.2013

Figure 12:
FIG. 12 is a table view illustrating a weight that is computed for each sentence of the input content based on associated keywords according to an embodiment herein.

FIG. 12 is a table view 1200 illustrating a weight 1202 that is computed for each sentence of the input content 502 based on associated keywords 1204 according to an embodiment herein. As described, computing the weight for the sentence S1, a weight is computed for each sentence of the input content 502 as shown in the table.

From the graph 1000 of FIG. 10, the graph generating module 318 interprets that S1 is most important sentence when compared to other sentences, because it has more number of associations with the keywords. In one embodiment, the current example explains a simple weighting scheme based on keywords. However, weighting scheme can also depend on various factors, like sentence selection, section selection and sentiments selection.

Once the most important sentences are identified, the intent building module 322 is used for tailoring sentences together in the exact sequence in which they appear in the original text, and provides summary of the input content 502. The number of sentences to be used as a summary depends on an input parameter from the user 102 as well as a weighted cut-off that is configurable.

In one embodiment, the user 102 can expand the summary of the input content 502 using the intent expanding module 324. For example, a first level of summary for the input content 502 has only S1 (having a highest weight). If the user wants to expand the summary to a second level, the intent expanding module 324 relaxes weight of sentences. Then, a next most important sentence is S11 (associated with 5 keywords, and having next highest weight) is tailored with S1 in the exact sequence in which they appear in the input content 502. In one embodiment, when a summary on a particular section is requested, then the summary is generated by considering only sentences occurring in that section. Similarly, in another embodiment, when a summary on a particular page is requested, then the summary is generated by considering only sentences occurring in that page. In yet another embodiment, the user 102 intents to summarize content around a particular keyword.

Figure 13:
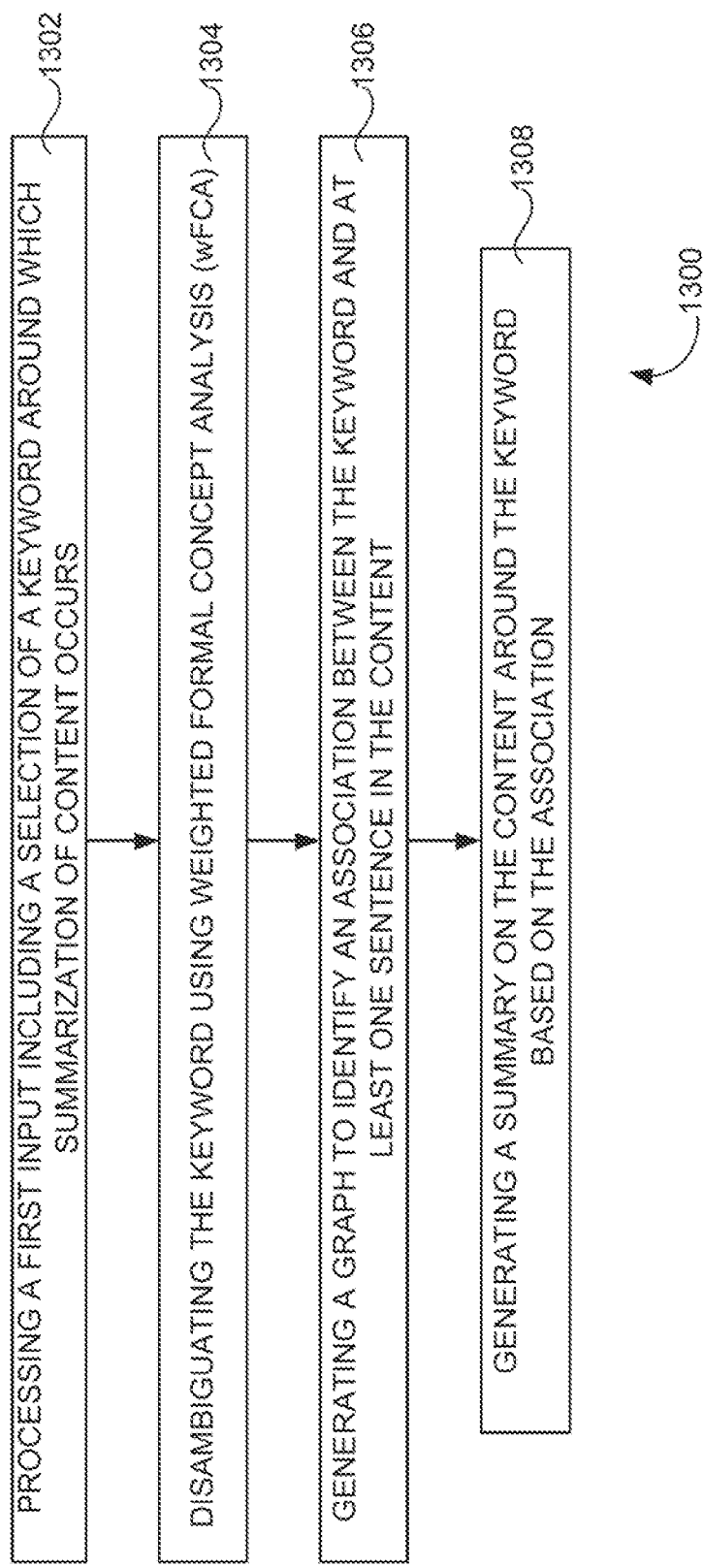
FIG. 13 is a flow diagram illustrating summarizing of content around a keyword using Formal concept analysis (wFCA) according to an embodiment herein.

FIG. 13 is a flow diagram 1300 illustrating summarizing of content around a keyword using Formal concept analysis (wFCA) according to an embodiment herein. The method includes: In step 1302, processing a first input including a selection of the keyword around which summarization of content occurs. In one embodiment, the keyword identifying module 314 processes the first input, and identifies the keyword. In another embodiment, the user 102 provides the keyword. In step 1304, disambiguating the keyword using wFCA occurs. Disambiguating of the keyword occurs by generating a lattice using the lattice construction module 326. The lattice includes one or more concepts which are generated with one or more keywords as objects, and categories associated with the one or more keyword as attributes. The one or more keywords are obtained based on parts of speech tagged by the POS token annotations module 610, and/or the POS line annotations module 612. In step 1306, generating a graph to identify an association between the keyword and at least one sentence in the content occurs. In one embodiment, the sentence identifying module 320 identifies the at least one sentence that is associated with the keyword. In step 1308, generating a summary on the content around the keyword occurs based on the association.

For example, the user 102 intents to summarize the input content 502 of FIG. 5 around a keyword "Kingfisher". In one embodiment, a list of keywords that are identified by the keyword identifying module 314 is provided to the user 102 in the intent analytics field 704 of FIG. 7. The user 102 selects a keyword "Kingfisher" from the list of keywords. In another embodiment, the user 102 specifies the keyword "Kingfisher" around which summarization of the input content 502 occurs. Once the keyword "Kingfisher" is provided by the user 102, the disambiguating module 316 identifies a meaning of the keyword "Kingfisher" in a context of the input content 502 as described previously. With the disambiguated keyword "kingfisher", the graph generating module 318 generates the graph 1000 of FIG. 10. The weight assigning module 330 assigns a weight for a sentence of the input content 502 based on a count that corresponds to one or more keywords associate with a node that corresponds to the sentence. Similarly, a weight is assigned for each sentence of the input content 502 as described.

With the graph 1000, the sentence identifying module 320 identifies one or more sentences that are associated with the keyword "kingfisher". For instance, such sentences include S1, S4, S5, S7, S9, S10, and S11. The intent building module generates a summary on the input content 502 around the keyword "kingfisher" based on the sentences that associate with the keyword "kingfisher". The intent building module 322 tailors the sentences together in the exact sequence in which they appear in the original text, and provides the summary of the input content 502 around the keyword "kingfisher". The number of sentences to be used as a summary depends on an input parameter from the user 102 as well as a weighted cut-off that is configurable. The intent expanding module 324 expands the summary with a first level of summary includes a sentence S1, whereas a second level summary may include the sentence S11, and the sentence S10.

In one embodiment, the user 102 can summarize content around more than one keyword. For example, the user 102 may intent to summarize a broader concept "finance", the content summarization engine extracts one or more keywords from the input content 502 relates to the concept "finance" using the knowledge base 218 of FIG. 2. For instance, the one or more keywords that are extracted from the input content 502, and relates to the concept "finance" include investors, shares, financial times, banks, deals, economy, profit, debt, market value, equity, etc. A weight is assigned to each sentence of the input content 502 based on an association of the one or more keywords with each sentence. A summary is generated based on the input content 502 around more than one keyword based on the association. In another embodiment, the user 102 also obtains a summary on the input content 502 around duration, and/or quantities based on sentences that are identified by the duration and quantities annotations module 614, and/or section duration annotations module 620.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 14:
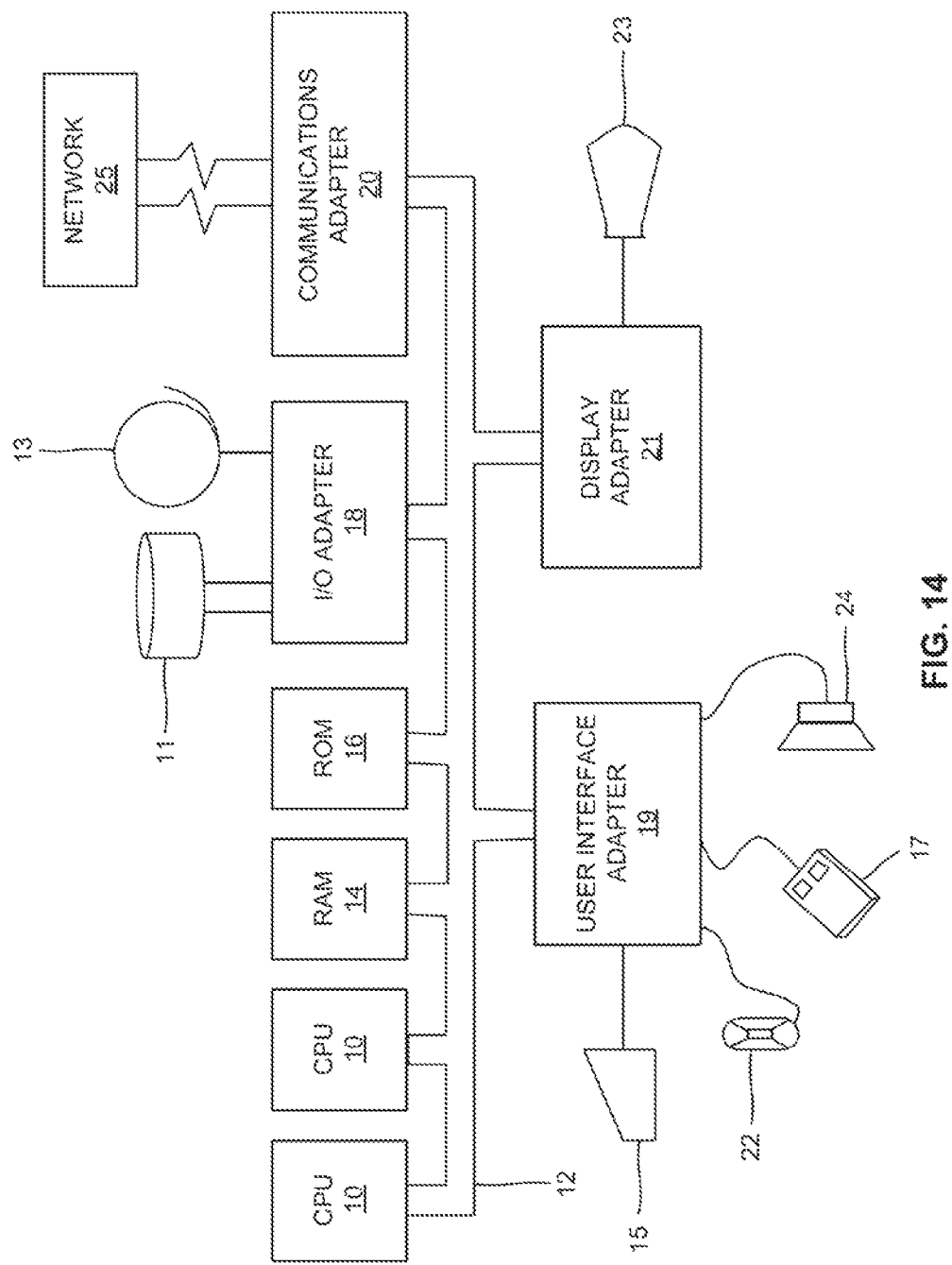
FIG. 14 illustrates a schematic diagram of a computer architecture according to an embodiment herein.

A representative hardware environment for practicing the embodiments herein is depicted in FIG. 14. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The content summarization engine 106 provides the user 102 a more precise summary on content, and assists the user 102 to grasp it quickly. Moreover, sentences of the content are stitched in an exact order as appear in the content. This provides continuity and clear understanding to the user 102 while reviewing the summary. The content summarization engine 106 saves considerable amount of user's time by providing the summary, and the user 102 can also expand the summary for better understanding. Also, the user 102 obtains a summary on the content based on their intent.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A method of summarizing content using weighted Formal Concept Analysis (wFCA) comprising:
   (i) identifying, by a processor, a plurality of keywords in said content based on parts of speech, wherein said content comprises a plurality of sentences and said plurality of keywords;
   (ii) identifying, by said processor, an ambiguous keyword from said plurality of keywords, wherein said ambiguous keyword has more than one meaning;
   (iii) generating, by said processor, a plurality of concepts based on (a) said plurality of keywords as objects, and (b) categories associated with said plurality of keywords as attributes, and wherein said categories are obtained from a knowledge base;
   (iv) computing, by said processor, a score for each concept of said plurality of concepts;
   (v) disambiguating, by said processor, said ambiguous keyword based on said score to obtain a right meaning of said ambiguous keyword in context of a sentence in said content;
   (vi) identifying, by said processor, an association between said plurality of keywords and at least one sentence in said content;
   (vii) determining, by said processor, a weight associated with each keyword of said plurality of keywords based on a number of associations of said each keyword with said at least one sentence in said content;
   (viii) identifying, by said processor, a set of associated keywords that are specific to each sentence of said at least one sentence, from said plurality of keywords;
   (ix) determining, by said processor, a weight associated with each sentence of said at least one sentence based on a weight of each keyword of said set of associated keywords;
   (x) selecting at least one sentence from said plurality of sentences in said content based on said weight associated with said each sentence; and
   (xi) generating, by said processor, a summary of said content, wherein said summary comprises said at least one sentence selected based on said weight.

2. The method of claim 1, further comprising generating a lattice that comprises said plurality of concepts.

3. The method of claim 2, wherein said categories are not arranged based on a hierarchy.

4. The method of claim 3, wherein a score for a concept of said plurality of concepts is computed based on (i) a number of associations of said concept with other concepts in said lattice, and (ii) said plurality of keywords.

5. The method of claim 2, further comprising drilling-down a subset of categories associated with said plurality of keywords to obtain a contextual information, wherein said subset of categories are arranged hierarchically, wherein said contextual information indicates an affinity among said plurality of keywords.

6. The method of claim 5, wherein said contextual information is obtained to disambiguate said ambiguous keyword.

7. The method of claim 1, further comprising generating a graph to identify said association, wherein said graph comprises a plurality of nodes, wherein each node indicates a sentence in said content.

8. The method of claim 1, further comprising expanding said summary based on said weight assigned for said each sentence in said content.

9. A non-transitory program storage device readable by computer, and comprising a program of instructions executable by said computer to perform a method for summarizing content using weighted Formal Concept Analysis (wFCA), said method comprising:
   (i) identifying, by a processor, a plurality of keywords in said content based on parts of speech, wherein said content comprises a plurality of sentences and said plurality of keywords;
   (ii) identifying, by said processor, an ambiguous keyword from said plurality of keywords, wherein said ambiguous keyword has more than one meaning;
   (iii) generating, by said processor, a plurality of concepts based on (a) said plurality of keywords as objects, and (b) categories associated with said plurality of keywords as attributes, and wherein said categories are obtained from a knowledge base;
   (iv) computing, by said processor, a score for each concept of said plurality of concepts;

(v) disambiguating, by said processor, said ambiguous keyword based on said score to obtain a right meaning of said ambiguous keyword in context of a sentence in said content, wherein a lattice is generated that comprises said plurality of concepts;

(vi) generating, by said processor, a graph to identify an association between said plurality of keywords and at least one sentence in said content, wherein said graph comprises a plurality of nodes, wherein each node indicates a sentence in said content;

(vii) determining, by said processor, a weight associated with each keyword of said plurality of keywords based on a number of associations of said each keyword with said at least one sentence in said content;

(viii) identifying, by said processor, a set of associated keywords that are specific to each sentence of said at least one sentence, from said plurality of keywords;

(ix) determining, by said processor, a weight associated with each sentence of said at least one sentence based on a weight of each keyword of said set of associated keywords;

(x) selecting at least one sentence from said plurality of sentences in said content based on said weight associated with said each sentence; and (xi) generating, by said processor, a summary of said content, wherein said summary comprises said at least one sentence selected based on said weight.

10. The non-transitory program storage device of claim 9, wherein said categories are not arranged based on a hierarchy.

11. The non-transitory program storage device of claim 9, wherein said method further comprises drilling-down a subset of categories associated with said plurality of keywords to obtain a contextual information, wherein said subset of categories are arranged hierarchically, and wherein said contextual information indicates an affinity among said plurality of keywords.

12. A system for summarizing content around a keyword based on weighted Formal Concept Analysis (wFCA) using a content summarization engine, said system comprising: (a) a memory unit that stores (i) a set of modules, and (ii) a database; (b) a display unit; (c) a processor that executes said set of modules, wherein said set of modules comprise:

(i) a keyword identifying module executed by said processor that processes a first input comprising a selection of said keyword around which summarization of said content occurs, wherein said content comprises a plurality of sentences and a plurality of keywords;

(ii) a disambiguating module executed by said processor that
  (a) identifies an ambiguous keyword from said plurality of keywords,
wherein said ambiguous keyword has more than one meaning;
  (b) generates a plurality of concepts based on (i) said plurality of keywords as objects, and (ii) categories associated with said plurality of keywords as attributes, and wherein said categories are obtained from a knowledge base;
  (c) computes a score for each concept of said plurality of concepts; and
  (d) disambiguates said ambiguous keyword based on said score to obtain a right meaning of said ambiguous keyword in context of a sentence in said content, wherein a lattice is generated that comprises said plurality of concepts;

(iii) a graph generating module executed by said processor that generates a graph to identify an association between said keyword and at least one sentence in said content, wherein said graph comprises a plurality of nodes, wherein each node indicates a sentence in said content;

(iv) a keyword identifying module executed by said processor that
  (a) determines a weight associated with each keyword of said plurality of keywords based on a number of associations of said each keyword with said at least one sentence in said content; and
  (b) identifies a set of associated keywords that are specific to each sentence of said at least one sentence, from said plurality of keywords;

(v) a weight assigning module executed by said processor that determines a weight associated with each sentence of said at least one sentence based on a weight of each keyword of said set of associated keywords; and (vi) an intent building module executed by said processor that
  (a) selects at least one sentence from said plurality of sentences in said content based on said weight associated with said each sentence; and
  (b) generates a summary of said content around said keyword, wherein said summary comprises said at least one sentence selected based on said weight.

13. The system of claim 12, wherein said set of modules further comprises an intent expanding module executed by said processor that expands said summary based on said weight assigned for each sentence of said plurality of sentences of said content.

* * * * *